No. 752,579. PATENTED FEB. 16, 1904.
A. McLAREN.
LEMON SQUEEZER.
APPLICATION FILED JUNE 18, 1903.
NO MODEL.
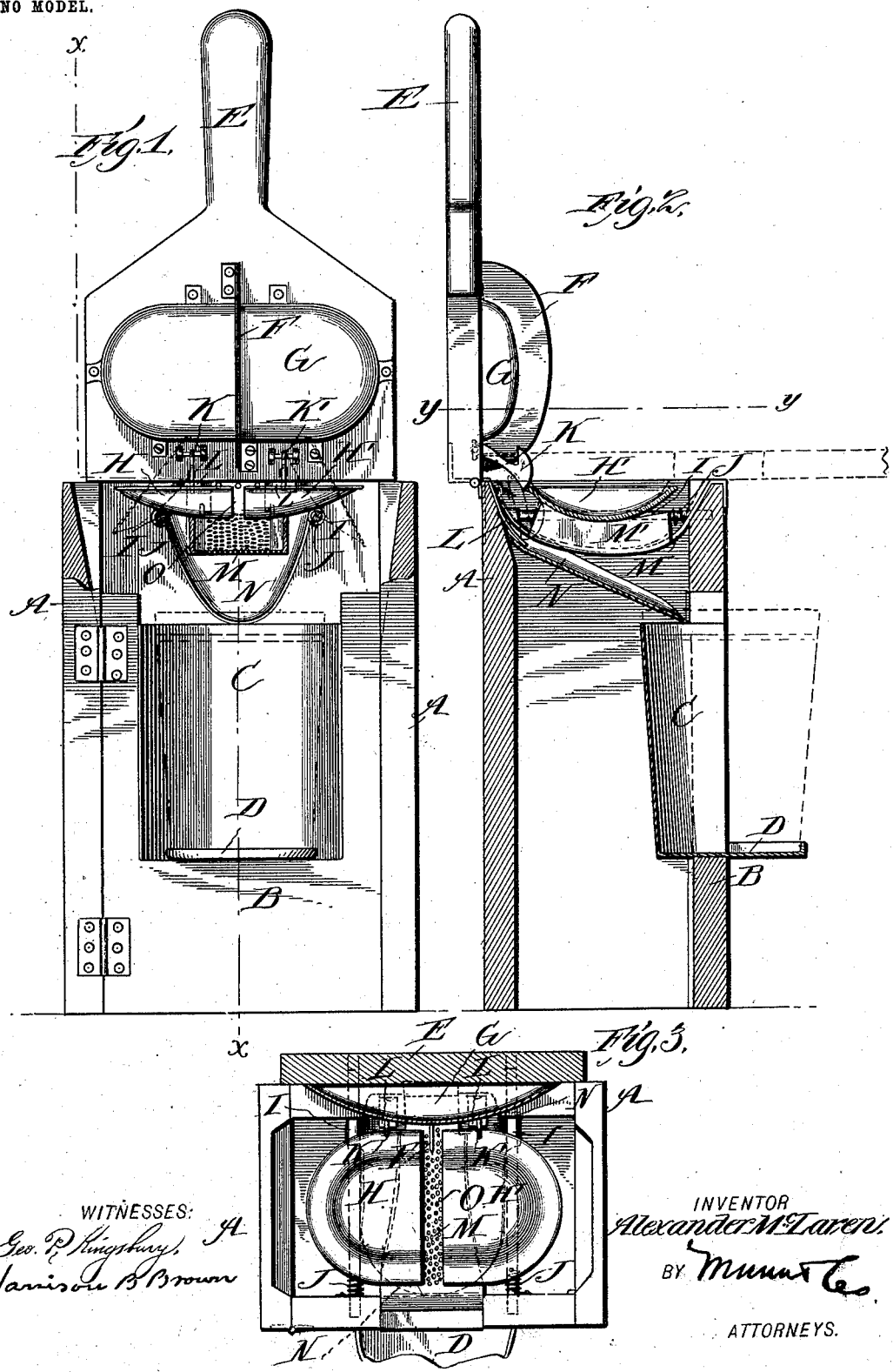
WITNESSES:
Geo. P. Kingsbury,
Harrison B. Brown
INVENTOR
Alexander McLaren.
BY Munn & Co.
ATTORNEYS.

No. 752,579. Patented February 16, 1904.

UNITED STATES PATENT OFFICE.

ALEXANDER McLAREN, OF FORT WORTH, TEXAS.

LEMON-SQUEEZER.

SPECIFICATION forming part of Letters Patent No. 752,579, dated February 16, 1904.

Application filed June 18, 1903. Serial No. 162,061. (No model.)

*To all whom it may concern:*

Be it known that I, ALEXANDER MCLAREN, a citizen of the United States, and a resident of Fort Worth, in the county of Tarrant and State of Texas, have invented a new and Improved Lemon-Squeezer, of which the following is a specification.

My invention relates to lemon-squeezers; and it consists of the hereinafter-described new and improved lemon-squeezer involving novel construction and arrangement of parts whereby a lemon may be cut and squeezed with one operation.

The invention consists, further, in peculiar means adapted to strain the juice, and, further, of peculiar devices automatically operating upon upward movement of the squeezing-lever to discharge the squeezed portions of the lemon.

In order to enable others to make and use my invention, I will now proceed to describe it in detail with reference to the accompanying drawings, forming a part of this specification, and in which—

Figure 1 is a front elevation, partly broken away, to illustrate my invention. Fig. 2 is a vertical sectional view on line X X, Fig. 1; and Fig. 3 is a horizontal sectional view on line Y Y, Fig. 2.

In carrying out my invention I employ a suitable frame or box A, having at its front side a door B. The upper portion of the door B is depressed, as at C, and a shelf D is provided at the lower end of the said depressed portion C in the door, adapted for supporting a cup or other vessel into which the strained juice is fed, as will appear farther on.

E denotes a suitable lever hinged to the upper edge of the rear wall of the box A, as shown. The under side of the lever E is provided with a depending longitudinally-arranged fixed knife F and an elongated convex surface G. Within the upper portion of the box A, I arrange two dished and spaced trays H H', having hinged support on horizontal bars I.

It will be noticed that the hinge connection of the trays H H' with the bars I is located out of balance and that the trays are yieldingly held to horizontal position by suitable springs J. On the under side of the lever E yielding catches K K' are arranged, adapted for engagement with the trays H H' and operating, upon upward movement of the lever E, to tilt them, and thereby discharge or dump the squeezed portions of the lemon down into or through the box A. The catches are forced forward against their spring tension into engagement with the trays H H' by yielding springs L at the inner upper rear side of the box, as shown.

Under the longer and spaced ends of the trays H H', I arrange a strainer M, adapted to catch and hold the lemon-seeds and any pulp that may be squeezed from the cut portions of the lemon. The strainer M may have any suitable support adapting it to be readily removed. It will be noticed that I form the strainer with side walls M', upon which rest the longer end of the trays H H'.

Under the strainer M, I arrange a chute N, which is inclined downwardly and adapted to convey the strained juice into a cup or vessel placed on the shelf D.

My invention will be understood from the above description. In use the lever E is raised and a lemon placed on the trays H H'. Now it is apparent that upon downward movement of the lever the lemon will be cut through and the two parts thereof pressed between the convex surface G and the trays H H'. By this action all juice is squeezed from the lemon. The juice, seeds, and loosened pulp pass down through the knife-space O between the trays H H' into the strainer M. The strained juice is then guided to a cup or vessel on the shelf D by the chute N, as will be understood.

Upon raising the lever E the catches K K' will tilt the trays H H', as shown, and thereby dump the two portions of the squeezed lemon down into the box A', if it has a closed bottom, or through it to any suitably-supported vessel below.

Having thus described my invention, what I claim as new, and desire to secure by Letters Patent, is—

1. The combination in a lemon-squeezer, of cutting means, squeezing means, means whereby the lemon is supported while being cut and squeezed, consisting of juice-guiding spring-actuated spaced trays adapted to be dumped, and yielding catches on the squeezing means, whereby the trays are engaged, tilted and dumped, upon raising action of the squeezing means, substantially as described.

2. The combination in a lemon-squeezer, of a supporting-frame, a hinged lever having on its under side a depending knife and a convex surface, yielding catches on the hinged lever, spring-actuated juice-guiding trays adapted to be dumped by the said catches, upon raising action of the hinged lever, the trays being spaced apart providing passage for the depending knife, which passage shall exclude entrance of the lemon-seed, a strainer under the dumping trays, and a lower juice-chute, substantially as described.

3. The combination with a lemon-squeezer of the character described, of a suitable frame having a depressed, open top, front side, a shelf at the lower end of said depressed portion, means for supporting the lemon, adapted to be dumped, cutting and squeezing means, a strainer and a juice-chute leading from under the strainer, into the open top depressed front side, substantially as described.

ALEXANDER McLAREN.

Witnesses:
JOHN W. MORGAN,
HARRY DAVIDSON.